R. BRUNER.
AUTOMOBILE LOCK.
APPLICATION FILED APR. 22, 1920.
1,384,594.
Patented July 12, 1921.
2 SHEETS—SHEET 1.
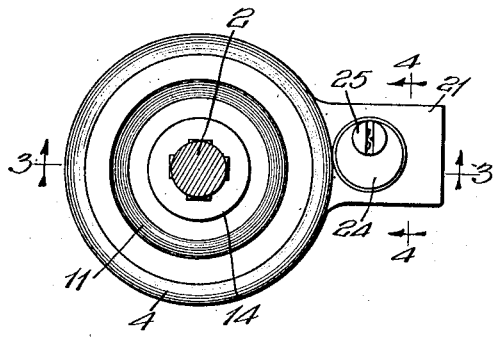
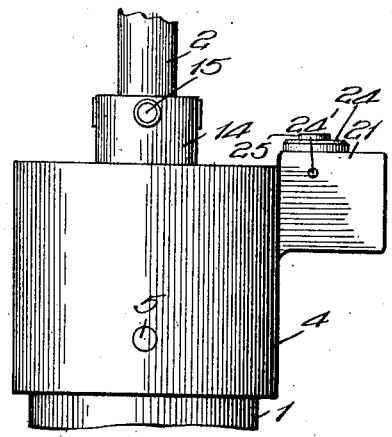
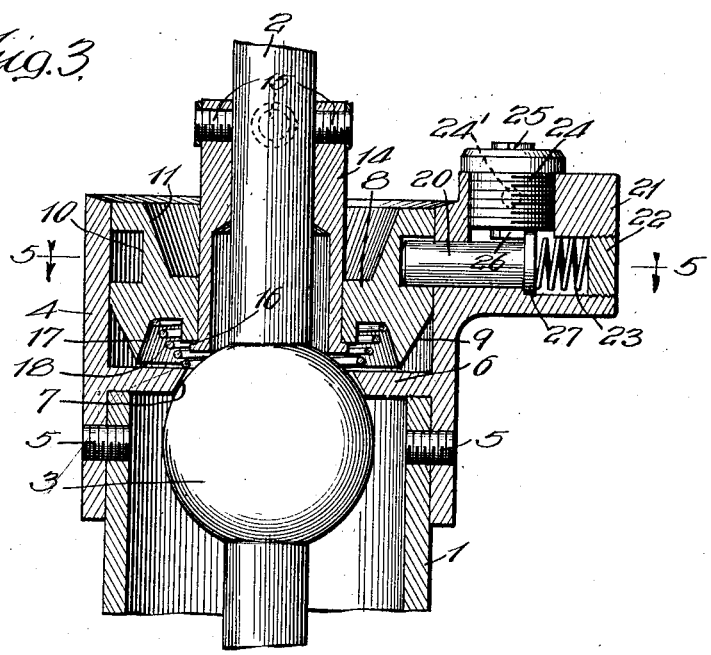
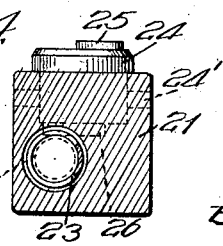
Witnesses:
W. F. Kilroy
Harry R. LeWhite
Inventor:
Rudolph Bruner

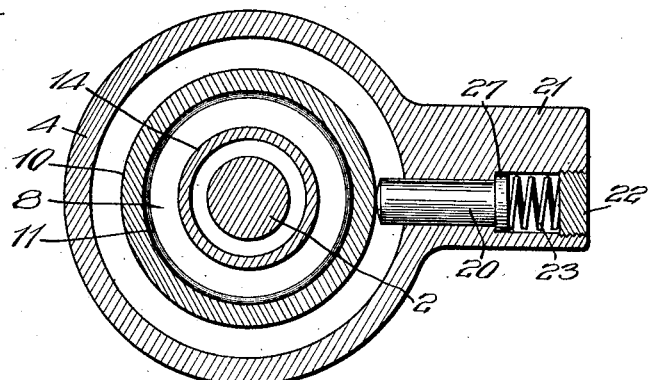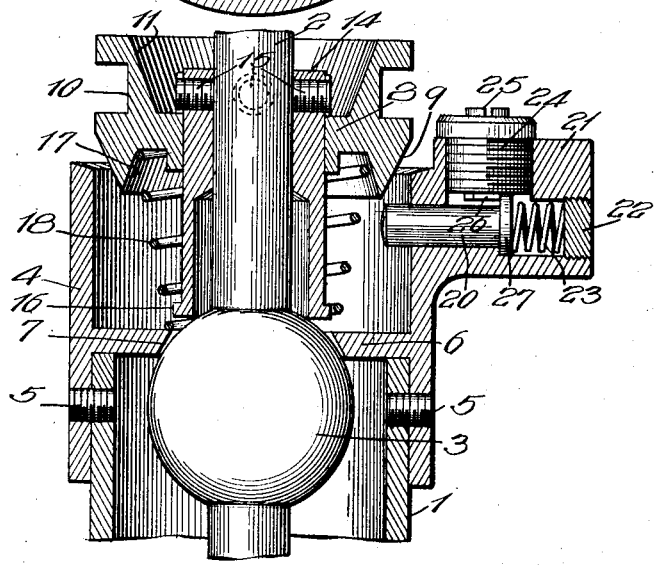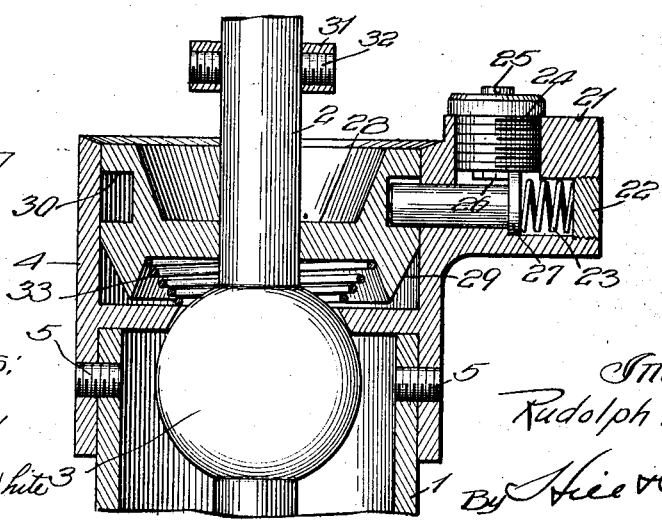

UNITED STATES PATENT OFFICE.

RUDOLPH BRUNER, OF CHICAGO, ILLINOIS, ASSIGNOR TO JOHN P. DALES AND M. JAY MEYERS, BOTH OF CHICAGO, ILLINOIS.

AUTOMOBILE-LOCK.

1,384,594.     Specification of Letters Patent.     Patented July 12, 1921.

Application filed April 22, 1920. Serial No. 375,750.

*To all whom it may concern:*

Be it known that I, RUDOLPH BRUNER, a citizen of German Austria, residing at Chicago, in the county of Cook and State of Illinois, have invented certain new and useful Improvements in Automobile-Locks, of which the following is a description.

My invention belongs to that general class of devices known as locks, and relates particularly to an automobile locking mechanism adapted to be used on automobiles or other vehicles, or wherever found applicable for locking the gear-shift or other lever against operation. The invention has among its objects the production of a device of the kind described that is simple, convenient, durable, reliable, compact, efficient, and satisfactory for use wherever found applicable. More especially it has as an object the production of a locking mechanism which cannot be easily broken or released by tampering with the same. Many other objects and advantages of the construction herein shown and described will be obvious to those skilled in the art from the disclosure herein given.

To this end my invention consists in the novel construction, arrangement and combination of parts herein shown and described, and more particularly pointed out in the claims.

In the drawings, wherein like reference characters indicate like or corresponding parts, Figure 1 is a plan view of my improved device;

Fig. 2 is a side elevation of the same;

Fig. 3 is a sectional view taken substantially on line 3—3 of Fig. 1;

Fig. 4 is a sectional view taken substantially on line 4—4 of Fig. 1;

Fig. 5 is a sectional view taken substantially on line 5—5 of Fig. 3;

Fig. 6 is a sectional view similar to Fig. 3, illustrating the device unlocked; and Fig. 7 is a sectional view similar to Fig. 3 of a simplified construction.

Referring to the drawings, 1 represents a portion of the transmission casing, or its equivalent, from which projects a gear shift lever 2, which in the type of device shown is provided with a ball 3 forming a swivel so that the lever can be shifted from side to side as well as forward and backward as may be required. Permanently secured to the casing part 1 is a tubular shell or part 4, which may be secured in place in any desired manner. In the case illustrated, I have shown screws 5 for securing the two parts together, the screws being cut off flush with the outside of the shell 4, after the parts have been secured together. Part 4 is provided with a partition 6 having an opening 7 therethrough through which the lever 2 projects. As shown, part 4 is recessed or chambered so as to receive a member 8, which is preferably formed with an inclined face 9 at the inside, as shown, and with a groove 10 extending to the periphery or exterior of the same. Part 8 is also preferably recessed as at 11, for the reasons hereinafter set forth.

In the construction illustrated in Figs. 1 to 6, I have shown a sleeve or collar 14 arranged on the lever 2, the same being secured thereto by screws 15, or the equivalent, all or a portion of which are preferably cut off after the same have been turned down into place so that the same can not be loosened and the lock tampered with. This, however, is not so essential, as tampering with the sleeve in the construction shown does not affect the locking action. As shown, the sleeve 14 is provided with a flange or projecting part 16, so disposed, as to limit the downward movement of the part 8.

Arranged below the locking member 8 and above the partition 6 is a spring 18, which tends to normally move the member 8 when unlocked, as indicated in Fig. 6, and support it in said position. When the device is locked, the member 8 is normally maintained, as shown in Fig. 3, by a locking member 20, the spring, as shown in this figure, being compressed so that when the locking member 20 is retracted the spring will throw the member 8 to an operative position. In the construction illustrated, member 20 is key-controlled. As shown, the outer shell 4 is provided with an extending part 21, chambered to receive the locking bolt 20, and a spring 23 normally arranged to maintain the locking bolt in operative locking position. The bolt 20 is preferably cylindrical and flanged at 27. The extending part 21 is shown provided with an opening normally closed by a closure 22, which is finished substantially flush with the part 21, so that the same cannot be easily removed, after it has once been set in place. The movement of the locking bolt 21 is controlled by a key-controlled barrel or plug 25 arranged in the casing 24, which is secured in the extending part 21 by a pin 24', or equivalent means for the purpose. As shown in Figs. 3 and 6, the plug 25 is provided with a cam member 26 arranged to coöperate with the flange or extending part 27 on the bolt 20.

In the simplified construction shown in Fig. 7, the sleeve 14 is omitted, member 28 corresponding to member 8 being provided with an opening arranged to slidably but closely fit the lever. The stop 31 secured by screws 32, or the equivalent, is also provided, the same limiting the upward movement of the member 28 when the locking bolt is retracted to an operative position.

The operation of the device and installation may be briefly described as follows: The device is installed and locked on the transmission part 1, as before set forth, the sleeve 14, when employed, being secured to the lever 2. The spring 23 normally maintains the locking bolt 20, as shown in the figure. When, however, the key plug 25 is rotated, the same retracts the bolt 20 and the spring 18 thereupon throws the member 8 substantially as indicated in Fig. 6. The key to the locking member may then be removed and the locking bolt substantially returns to an operative position, as indicated in Fig. 6. When it is desired to lock the shift lever, or the equivalent, against movement, it is only necessary to depress the member 8, for example, pushing the same down with the foot, as indicated in Fig. 3. The cam or inclined face 9 on the member 8 retracts the locking bolt until the groove 10 registers with the bolt 20, after which the bolt under the pressure of the spring 23 is moved into engagement with the member, as shown in Fig. 3, and maintained in operative engagement until the key is again inserted and the bolt retracted. The operation of the simplified construction shown in Fig. 7 is substantially similar.

It will be noted that with this construction the full play and operation of lever 2 is not in any way interfered with. The device is easy to install, consists of few parts, and is practically secure against all tampering. The same may be inexpensively manufactured and is suitable for practically all transmission constructions.

What I claim as new and desire to secure by Letters Patent is:

1. In a lock of the kind described for controlling levers and in combination, a casing having a cylindrical bore and arranged about the lever, means for securing the same in place, a coöperating cylindrical member arranged to seat in said casing and provided with a continuous groove about the periphery thereof, and means for locking said member in the casing including a lock bolt carried by said casing and constructed to engage said member in said groove.

2. In a transmission gear shift lever locking device of the kind described and in combination, a tubular sleeve mounted on the transmission case and surrounding the gear shift lever, a locking element slidably mounted on said lever and of a size to substantially closely fit said sleeve, said locking element being provided with a circular continuous locking groove disposed therein intermediate its ends, a reciprocating locking plunger carried by said sleeve and adapted to enter the groove, and means disposed within an extension on the sleeve for controlling said plunger for engaging and locking said element in the sleeve, and means for moving and supporting said element out of operative relation with the sleeve when the element is released from said locking means.

3. In a transmission gear shift lever locking device, the combination with a tubular sleeve having a relatively large pocket in its upper end and adapted to surround a gear shift lever, a collar connected with said lever and a locking member slidably associated with said collar, said locking member being of a configuration to seat within the pocket in the sleeve and having disposed in its periphery a circular groove, a sliding lock detent carried by the casing, and locking means for said detent supported upon the casing.

4. In a transmission gear shift lever locking device of the kind described and in combination, a tubular sleeve mounted on the transmission casing and inclosing a portion of the lever, a locking element movably mounted on said lever, said element of a size and conforming in shape to closely fit the interior of the sleeve, said element provided with a groove about the periphery thereof, a locking bolt carried by said sleeve and arranged to engage said element in said groove, key-controlled means for moving said locking bolt out of engagement with said element, means for normally maintaining said locking bolt in operative position.

5. In a transmission gear shift lever locking device of the kind described and in combination, a tubular sleeve mounted on the transmission casing and inclosing a portion of the lever, a locking element movably mounted on said lever, said element of a size and conforming in shape to closely fit the interior of the sleeve, said element provided with a groove about the periphery thereof, a locking bolt carried by said sleeve and arranged to engage said element in said groove, key-controlled means for moving said locking bolt out of engagement with said element, means for normally maintaining said locking bolt in operative position, and means for moving said locking element out of the sleeve upon the retracting of said locking bolt, said moving means arranged to support the element in inoperative position when without the sleeve.

6. In a transmission gear shift lever locking device of the kind described and in combination, a tubular sleeve mounted on the transmission casing with the lever projecting therethrough, a locking element movably mounted on said lever, said element of a size and conforming in shape to closely fit the interior of the sleeve, said element provided with a groove about the periphery thereof and having an inclined edge about the bottom thereof, a locking bolt carried by said sleeve and arranged to engage said element in said groove, key-controlled means for moving said locking bolt out of engagement with said element, means for normally maintaining said locking bolt in operative position, and means for moving said locking element out of the sleeve upon the retracting of said locking bolt, said moving means arranged to support the element in inoperative position when without the sleeve.

7. In a transmission gear shift lever locking device of the kind described and in combination, a tubular sleeve mounted on the transmission and inclosing a portion of the shift lever, a sleeve member secured to the lever, a locking element movably mounted on said lever sleeve member and having a limited movement thereon, said element of a size and conforming in shape to closely fit the interior of the tubular sleeve, said element provided with a groove about the periphery thereof, a locking bolt carried by said tubular sleeve and arranged to engage said element in said groove, key-controlled means for moving said locking bolt out of engagement with said element, means for normally maintaining said locking bolt in operative engaging position, and means for automatically moving said locking element out of the sleeve upon the retracting of said locking bolt, said moving means arranged to support the element in inoperative position when without the sleeve.

8. In a transmission gear shift lever locking device of the kind described and in combination, a tubular sleeve mounted on the transmission and inclosing a portion of the shift lever, a sleeve member secured to the lever, a locking element movably mounted on said lever sleeve member and having a limited movement thereon, said element of a size and conforming in shape to closely fit the interior of the tubular sleeve, said element provided with a groove about the periphery thereof, a cylindrical locking bolt having a flanged end carried by said tubular sleeve and arranged at its opposite end to engage said element in said groove, key-controlled means for moving said locking bolt out of engagement with said element, means for normally maintaining said locking bolt in operative engaging position, and means for automatically moving said locking element out of the sleeve upon the retracting of said locking bolt, said moving means arranged to support the element in inoperative position when without the sleeve.

9. A transmission gear shift lever locking device, comprising a sleeve mounted on the transmission casing, a locking element movably mounted on the lever, said element being adapted to closely fit within the interior of the sleeve and provided with a circular detent receiving recess, a locking bolt carried by the sleeve and adapted to enter said recess when said element is depressed, key controlled means for moving said locking bolt, and means for normally maintaining the locking element in an inoperative position, said locking element being entirely encircled by said sleeve, substantially as described.

In testimony whereof, I have hereunto signed my name in the presence of two subscribing witnesses.

RUDOLPH BRUNER.

Witnesses:
  Roy W. Hill,
  Bertha Hartmann.